UNITED STATES PATENT OFFICE.

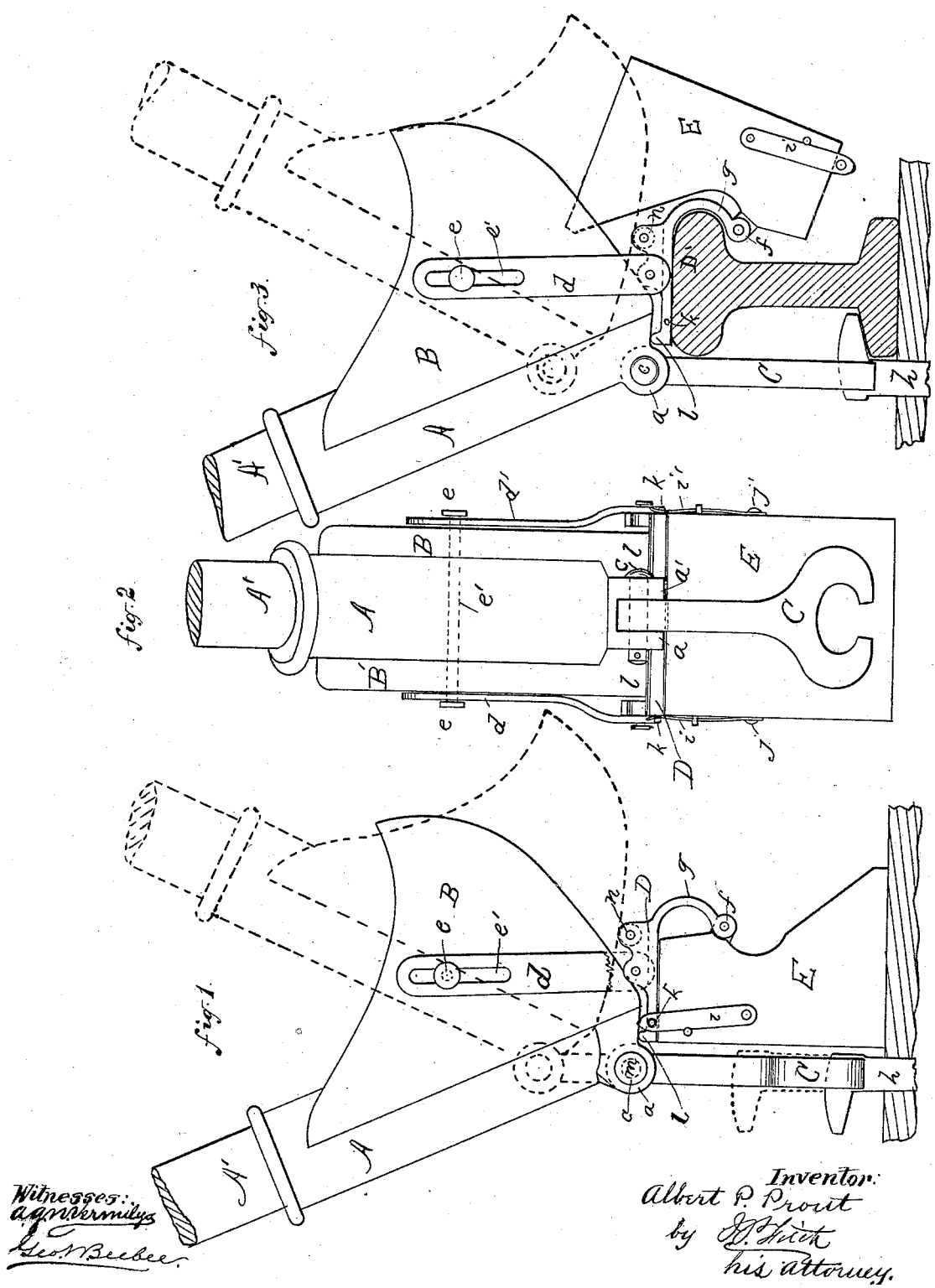

ALBERT P. PROUT, OF WOODHAVEN, NEW YORK.

SPIKE-EXTRACTOR.

SPECIFICATION forming part of Letters Patent No. 271,268, dated January 30, 1883.

Application filed August 4, 1882. (No model.)

*To all whom it may concern:*

Be it known that I, ALBERT P. PROUT, of Woodhaven, in the county of Queens and State of New York, have invented a new and useful Improvement in Spike-Extractors, of which the following is a specification, reference being had to the accompanying drawings, forming part of the same.

Figure 1 is a side elevation, and Fig. 2 is a front elevation, of a spike-extractor containing my improvement. Fig. 3 is also a side elevation of the same, showing the position of the parts when the extractor rests on a railroad-rail in the act of drawing a spike.

Letters Patent of the United States for a spike-extractor were issued to me and William B. Turner, February 28, 1882, numbered 254,411. My present invention is an improvement upon the extractor described and claimed in said Letters Patent, and of which the following is a full and correct description.

The lever consists of an iron tubular socket, A, in which is inserted a handle, A', which may be of gas-pipe. From opposite sides of the socket, at its lower end, are two wings, B B', that extend tangentially from the socket parallel to each other. The lower edges of these wings are curved, as shown in the drawings. At the lower end of the socket A are ears $a\ a'$, from which depends the claw C, the upper end of the shank of the claw being placed between the ears and connected therewith by a bolt, $c$, passing through the ears and said shank.

D is a fulcrum-plate that is placed under the said socket A and wings B. It extends across from side to side of said wings, and is connected with them by two bars, $a\ a'$—one on each side—that are pivoted at the lower ends to said plate and at the upper ends to the said wings B B' by a rod, $e$, that passes through holes in the said wings and slotted openings $e'$ in said bar. This permits a rocking motion of the wings on the rod $e$ and a vertical movement of them with reference to said bars, while the whole may swing on the pivots connecting said bars to the plate D.

E is a supporting-block, which is hinged at $f$ to the curved extensions of the plate D. It may be made solid, but preferably hollow, with walls only of sufficient thickness to bear the pressure upon the block exerted in operating the extractor. The top face of this block is fitted to receive and support the plate D, as is shown in Fig. 1. Fig. 3 represents the said plate resting upon a railroad-rail in the act of extracting a spike, $h$. $i\ i'$ are spring-catches, secured at $j\ j'$ to the said block, and provided with holes at their upper ends, that engage with pins $k\ k'$ in plate D to secure the said plate to the block when the block is used as a rest for the plate, as in Fig. 1.

$l$ is an upwardly-projecting rib that is formed on the edge of the plate D. It performs the office of a fulcrum for the lever during the first movement in extracting a spike. The distance between the said rib and the pivotal point $m$ of the claw being very small, a powerful leverage is obtained for starting the spike.

$n$ is a friction-roller, that rests in suitable bearings in the upper face of the plate D, on or near the edge of said plate, opposite the rib $l$. The lever, at first resting on said rib as the fulcrum in drawing a spike, as shown in full line in Figs. 1 and 3, is rocked on the said rib to the right, thus starting the spike until it comes in contact with the roller $n$, as shown in dotted lines in said figures, when that becomes the fulcrum, and the lever, being carried still farther to the right, entirely extracts the spike by a direct upward movement of the claw, the lever moving over the said roller to the left on its bottom edges, so as to maintain such direct upward movement of the claw. When the rail is used as a support for the fulcrum-plate D the supporting-block E is unhitched from said plate by springing outward the springs $i\ i'$ and swinging it on its hinge $f$ into the position shown in Fig. 3. When the said block is used as a support for said plate it is in position with reference to said plate as shown in Fig. 1.

I have thus described and shown in the drawings what I regard as the best form of the several parts of my extractor; but such form may be varied in several respects, to some extent, without departing from the spirit of my invention. The part of the lever shown as formed of the socket A and handle A' may, if preferred, be a single solid bar of iron, and the head of the lever, consisting, as described, of the wings B and B', may be a solid enlargement of a suitable form to accomplish the intended purpose.

The special form of the wings, or a corresponding solid enlargement of the lever at the bottom end, may be varied somewhat, it being only necessary that the bottom edge should be so formed as to rest upon, first, the rib $l$ in starting the spike, and then to slide or roll over the roller $u$, as before described.

The wings B B', or a corresponding enlargement, instead of extending wholly on one side of the socket A, may extend on both sides, the socket thus being placed centrally in such enlargement or wings.

In place of the slotted bars $d$ for connecting the lever to the plate D, any other suitable device may be employed for the purpose. So, also, in place of the spring-catches I I', any equivalent device for holding the plate D upon the upper surface of the block E may be employed.

I regard the fulcrum-rib $l$ and the friction-roller $n$ as each a valuable device, contributing considerably to the efficiency of the machine and intend to claim them as my invention; but the upper surface of the plate D may be made simply curved suitably to receive the bottom end of the lever and wings without the rib or roller.

What I claim, and desire to secure by Letters Patent, is—

1. The combination, with the lever A, the claw C, hinged thereto, and the fulcrum-bearing plate D, of the supporting-block E, hinged to said plate, so as to swing under and form a support for the same, substantially as and for the purpose described.

2. The combination of the lever A, carrying hinged claw C, and provided with enlargement or wings B B', as described, the plate D, bearing the fulcrums, and the bars $d\ d'$, hinged to said block, with slotted ends working on the projecting ends of rod $e$ on said enlargement or wings, all substantially as and for the purpose specified.

3. The combination, with the lever A, provided with the wings B B', or corresponding solid enlargement, of the plate D, carrying the rib-fulcrum $l$ and the roller-fulcrum $n$, together with the claw C, hinged to said lever, and the supporting-block E, hinged to said fulcrum-plate, so as to swing under the same, all substantially as and for the purpose specified.

ALBERT P. PROUT

In presence of—
  A. G. W. VERMILYA,
  GEO. W. BEEBEE.